US008073884B2

(12) United States Patent
Mercer

(10) Patent No.: US 8,073,884 B2
(45) Date of Patent: Dec. 6, 2011

(54) SYSTEM AND METHOD TO DERIVE HIGH LEVEL FILE SYSTEM INFORMATION BY PASSIVELY MONITORING LOW LEVEL OPERATIONS ON A FAT FILE SYSTEM

(75) Inventor: Paul Mercer, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 11/961,741

(22) Filed: Dec. 20, 2007

(65) Prior Publication Data

US 2009/0164534 A1 Jun. 25, 2009

(51) Int. Cl.
G06F 12/00 (2006.01)
G06F 17/30 (2006.01)

(52) U.S. Cl. ......... 707/821; 707/999.205; 707/E17.006; 711/100; 711/200; 711/E12.002

(58) Field of Classification Search .................. None
See application file for complete search history.

(56) References Cited

U.S. PATENT DOCUMENTS

| | | | | |
|---|---|---|---|---|
| 5,689,706 A * | 11/1997 | Rao et al. | | 1/1 |
| 5,873,118 A * | 2/1999 | Letwin | | 711/156 |
| 6,253,300 B1 * | 6/2001 | Lawrence et al. | | 711/173 |
| 6,604,170 B1 * | 8/2003 | Suzuki | | 711/111 |
| 6,675,276 B2 * | 1/2004 | Schulze et al. | | 711/200 |
| 6,715,102 B1 * | 3/2004 | Nishimura | | 714/20 |
| 7,093,161 B1 * | 8/2006 | Mambakkam et al. | | 714/15 |
| 7,181,473 B1 * | 2/2007 | Lacouture et al. | | 1/1 |
| 7,613,892 B2 * | 11/2009 | Urushibara et al. | | 711/170 |
| 7,734,864 B2 * | 6/2010 | Maeda et al. | | 711/103 |
| 2003/0065873 A1 * | 4/2003 | Collins et al. | | 711/100 |
| 2006/0004969 A1 * | 1/2006 | Suda | | 711/154 |
| 2006/0107009 A1 * | 5/2006 | Ooshima et al. | | 711/163 |
| 2006/0179037 A1 * | 8/2006 | Turner et al. | | 707/3 |
| 2007/0038835 A1 * | 2/2007 | Tan et al. | | 711/170 |
| 2007/0094231 A1 * | 4/2007 | Kim | | 707/1 |
| 2007/0136387 A1 * | 6/2007 | Malueg et al. | | 707/200 |
| 2007/0143571 A1 * | 6/2007 | Sinclair et al. | | 711/203 |
| 2007/0276882 A1 * | 11/2007 | Nishimura et al. | | 707/203 |
| 2008/0109589 A1 * | 5/2008 | Honda | | 711/103 |
| 2008/0155184 A1 * | 6/2008 | Gorobets et al. | | 711/103 |

* cited by examiner

Primary Examiner — Wilson Lee
Assistant Examiner — Jessica N Le

(57) ABSTRACT

A method (and corresponding system and computer program product) detects modified files and/or directories in a storage device. The method builds a file-sector coordination table for files in the storage device before relinquishing access control of the storage device to a host computer. The method passively monitors write transactions in the storage device from the host computer. The method identifies sectors affected by the monitored write transactions and stores in a sector list. The method regains access control of the storage device from the host computer and builds a list of modified files by intersecting the sector list with the file-sector coordination table. The method may optionally share the list of modified files with related applications.

20 Claims, 4 Drawing Sheets

SYSTEM AND METHOD TO DERIVE HIGH LEVEL FILE SYSTEM INFORMATION BY PASSIVELY MONITORING LOW LEVEL OPERATIONS ON A FAT FILE SYSTEM

BACKGROUND

1. Field of Disclosure

The disclosure generally relates to the field of data storage, in particular to file systems used in data storage devices.

2. Description of the Related Art

As the capacity of mobile storage devices (e.g., mobile computing devices, portable media players) increase, users are increasingly putting large amounts of data on these devices. Most of these devices use a version of File Allocation Table (FAT) file system to manage their data storage, such as FAT12, FAT16, and FAT32. A predominant reason of the popularity of FAT file systems among mobile storage devices is because they are compatible (or supported) and interoperable with computers running popular operating systems such as Microsoft Windows™, Mac OS™, and Linux™.

Users of the mobile storage devices frequently access and modify data stored in the devices through connected computers. For example, a user may transfer pictures from a desktop computer to a mobile computer device (e.g., a smart phone) and store the pictures in the device. When accessing a mobile storage device, the connected computer often takes over access control of the device and operates directly in the storage medium within the device. These direct operations often modify data on the mobile storage device (e.g., create a file, delete a directory). As a result, it is necessary for the mobile storage device to detect the modified files and directories and notify local applications utilizing the modified files such that they can update their indexes. For example, a media player application on a mobile computing device must index newly added media files on the device to keep its media library (or database) up-to-date.

FAT file systems are inefficient in detecting modified files and directories because of their poor timestamp semantics. In a FAT file system, files and subdirectories within a directory are represented by FAT entries (also called entries) in a directory table for the directory. An entry in a directory table includes information such as date and time of creation and time of last modification and address of the first sector allocated for the represented file or subdirectory.

A FAT entry for a directory does not maintain modification information for files and subdirectories in the directory (or in its direct or indirect subdirectories). Therefore, once the FAT file system loses high level access control to its storage medium, an application would need to recursively enumerate the entire FAT structure of the storage medium (e.g., visit every directory table in the file system) to detect modifications made during the time it does not have access control. As storage continues growing, this enumeration process can become time consuming.

For example, a mobile drive using a FAT file system containing 10,000 files is mounted on a computer and relinquishes high level access control to the computer. The computer modified a single file on the mobile drive. When the mobile drive is subsequently unmounted and regains access control, an application that wants to process modified files must enumerate the entire FAT structure, including entries for all 10,000 files, to locate the single modified file. This enumeration process is inefficient and can cause performance (or user experience) to suffer.

Thus, the art lacks a system and method for efficiently detecting modifications in a data storage device using a FAT file system.

SUMMARY

Embodiments of the present disclosure include a method (and corresponding system and computer program product) that detects modified files and/or directories in a storage device. The method builds a file-sector coordination table for files in the storage device before relinquishing access control of the storage device to a host computer. The method passively monitors write transactions in the storage device from the host computer. The method identifies sectors affected by the monitored write transactions and stores in a sector list. The method regains access control of the storage device from the host computer and builds a list of modified files by intersecting the sector list with the file-sector coordination table. The method may optionally share the list of modified files with related applications.

Advantages of the disclosed method include efficient detection of modified files. Devices containing storage medium frequently relinquish control of the file system on the storage medium to an external computer (the host computer), so that the host computer can access the storage medium directly. By using the disclosed embodiments, the devices can detect files and directories modified by the host computer without enumerating the entire FAT structure of the storage medium. As a result, systems and/or applications may index (or backup) the modified files quickly and provide prompt user access to up-to-date contents.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As described herein, modified files and directories include files and directories that are newly created (or added), changed, moved, or deleted.

Example Mobile Computing Device

Figure 1:
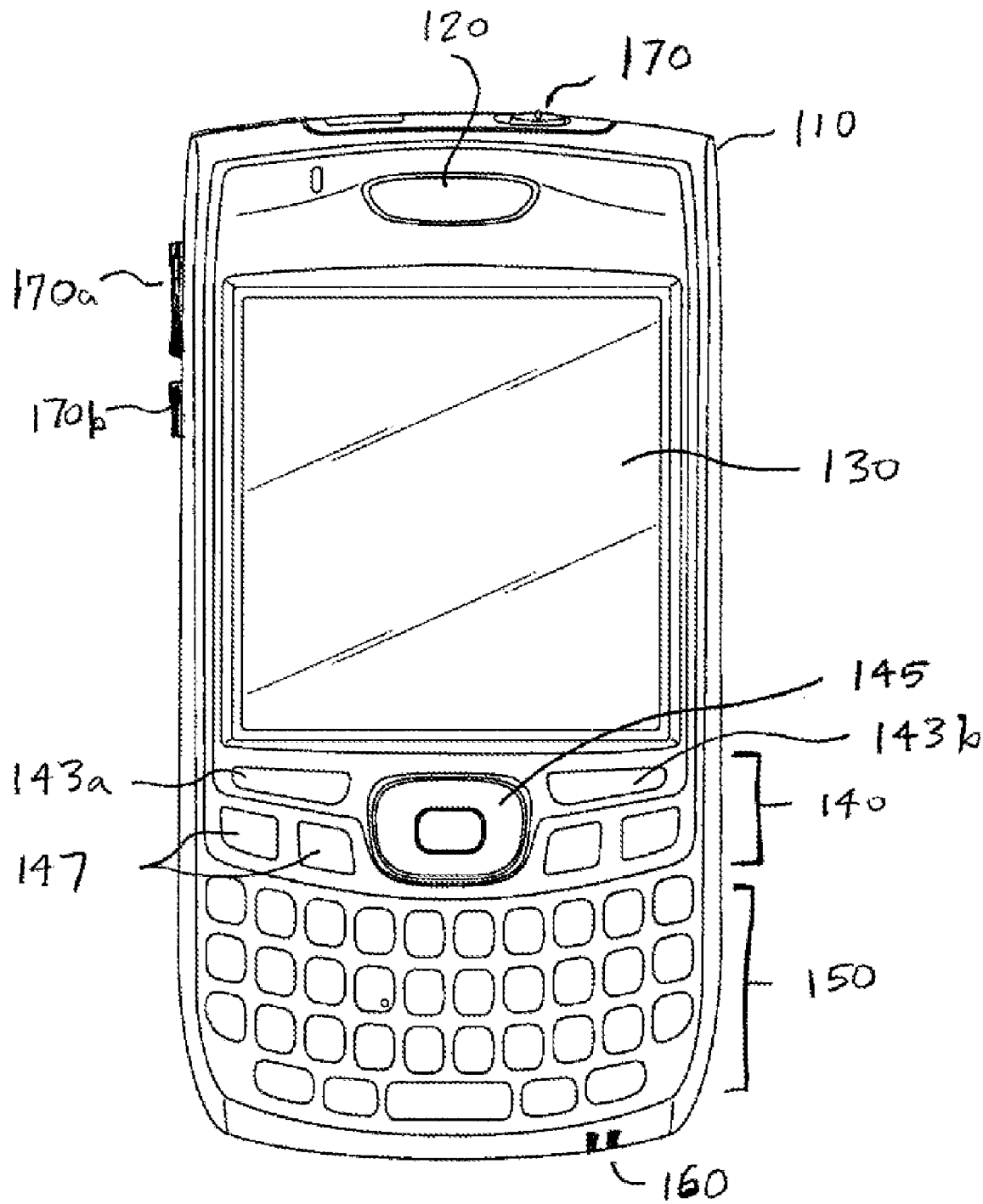
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality. Moreover, the principles disclosed herein may also be applied to other devices, such as personal digital assistants (PDAs), media players and other similar devices.

The mobile computing device 110 is configured to be of a form factor that is convenient to hold in a user's hand, for example, a personal digital assistant (PDA) or a smart phone form factor. For example, in one embodiment the mobile computing device 110 can have dimensions ranging from 7.5 to 15.5 centimeters in length, 5 to 12.75 centimeters in width, 0.64 to 2.2 centimeters in height and weigh between 55 and 230 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is e.g., 5) navigation ring (or joystick) 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dial pad) or a numeric keypad integrated with an alpha or alphanumeric keypad (e.g., a keyboard with consecutive keys of QWERTY, AZERTY, or other equivalent set of keys on a keyboard or a Dvorak keyboard).

Although not illustrated, it is noted that the mobile computing device 110 also may include an expansion slot (not shown). The expansion slot is configured to receive and support expansion cards (or media cards), which may include memory cards such as CompactFlash™ cards, SD cards, XD cards, Memory Sticks™, MultiMediaCard™, SDIO, and the like.

The mobile computing device 110 may also include a connector (not shown in FIG. 1) for connections with external computing devices, such as a desktop computer. The connection may be wired (e.g., via a Universal Serial Bus (USB) connection) or wireless (e.g., via a Bluetooth connection). The desktop computer can access and modify data stored in the mobile computing device 110 (e.g. data stored in integrated or embedded storage devices or in expansion cards) through the connection.

Example Mobile Computing Device Architectural Overview

Figure 2:
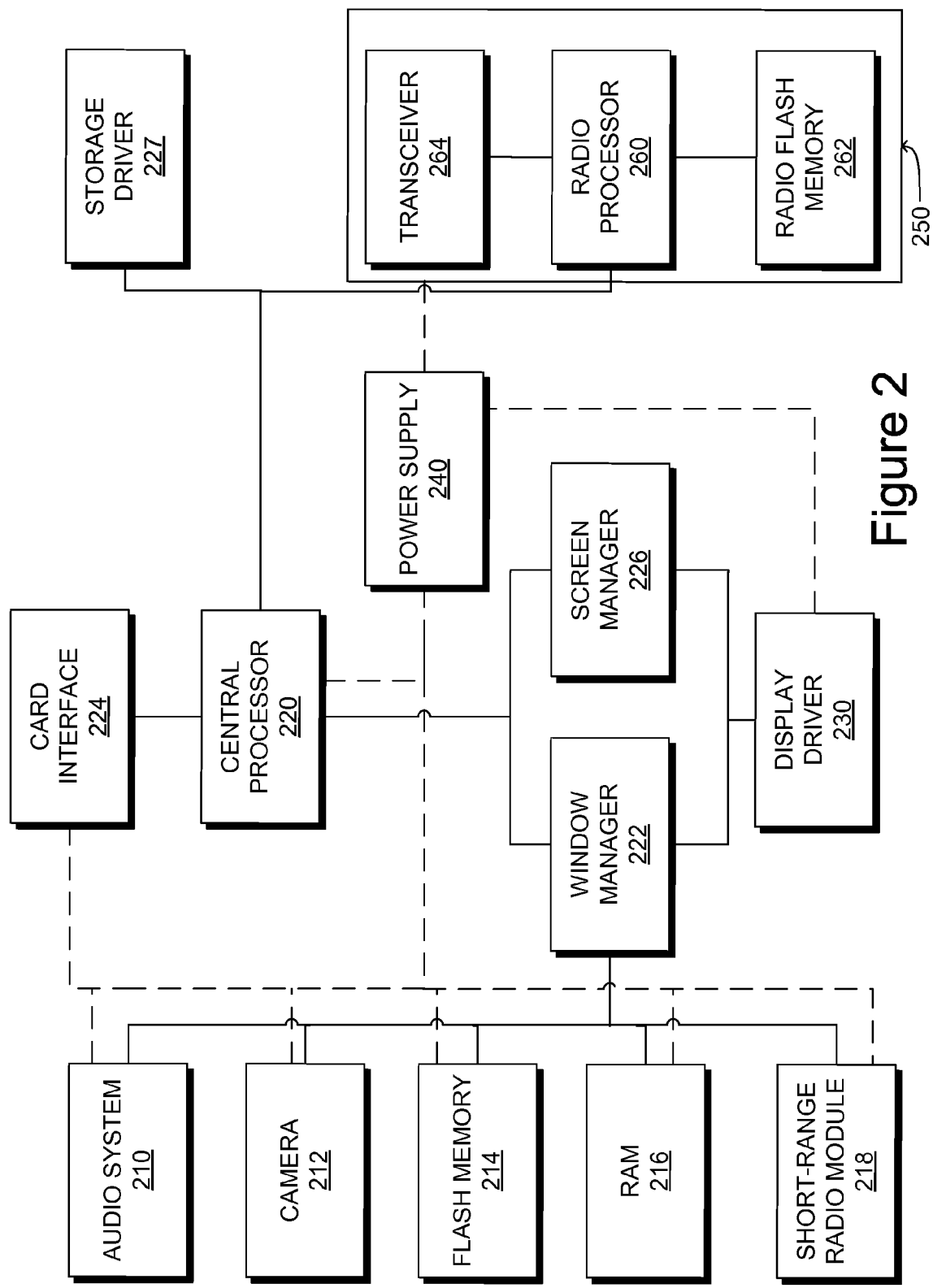
FIG. 2 illustrates one embodiment of an architecture of a mobile computing device.

Referring next to FIG. 2, a block diagram illustrates one embodiment of an architecture of a mobile computing device 110 with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, random-access memory (RAM) 216, short range radio module 218 (e.g., Bluetooth, Wireless Fidelity (WiFi) component), a window manager 222, a screen manager 226, and a storage driver 227. The power supply 240 powers the central processor 220, the radio subsystem 250 and a display driver 230 (which may be contact- or inductive-sensitive). The power supply 240 may correspond to a battery pack (e.g., rechargeable) or a powerline connection or component.

In one embodiment, the window manager 222 comprises a software or firmware instructions for processes that initialize a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to display and modify a window, such as resizing the window along one axis, moving the window along one axis or any other command altering the appearance or position of the window, and modifies the window accordingly.

The screen manager 226 comprises a software or firmware instructions for processes that manage content displayed on the screen 130. In one embodiment, the screen manager 226 monitors and controls the physical location of data displayed on the screen 130 and which data is displayed on the screen 130. The screen manager 226 alters or updates the location of data on the screen 130 responsive to input from the central processor 220, to modify the screen 130 appearance. In one embodiment, the screen manager 226 also monitors and controls screen brightness and transmits control signals to the central processor 220 to modify screen brightness and power usage to the screen 130.

The storage driver 227 comprises a software or firmware instructions for accessing data in local storage devices, such as the flash memory 214, the RAM 216, and/or other storage devices (e.g., disk drives) not illustrated in FIG. 2. The storage driver 227 may traverse (or enumerate) the local storage devices to collect information stored in the devices. In one embodiment, the storage driver 227 includes drivers for the local storage devices. In one embodiment, the storage driver 227 can relinquish high level access control of local storage devices to an external computer (hereinafter called the "host computer") such that the host computer can directly access data in the local storage devices. While the host computer has access control, the storage driver 227 may passively monitor transactions accessing data in the local storage devices and record (or accumulate) sectors affected by the transactions. The storage driver 227 may subsequently regain the access control and detect files and directories modified (or deleted, created, or moved) in the local storage devices by the host computer. An example architecture and methodology of the storage driver 227 is described in detail below.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot (not shown). The card interface 224 transmits data and/or instructions between the central processor 220 and an expansion card or media card included in the expansion slot. The card interface 224 also transmits control signals from the central processor 220 to the expansion slot to configure an expansion card or media card included in the expansion slot. In one embodiment, the card interface 224 works with the storage driver 227 in order to transmit data and/or instructions to and/or from the expansion card or media card included in the expansion slot.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Example Storage Driver Architectural Overview

The storage driver 227 detects modified files (e.g., data files) and directories in a storage device by tracking modified sectors in the device. The storage driver 227 passively monitors write transactions in local storage and, by consulting a file-sector coordination table, is able to maintain a list of files and directories that have been modified (e.g., changed, deleted, created, or moved).

Figure 3:
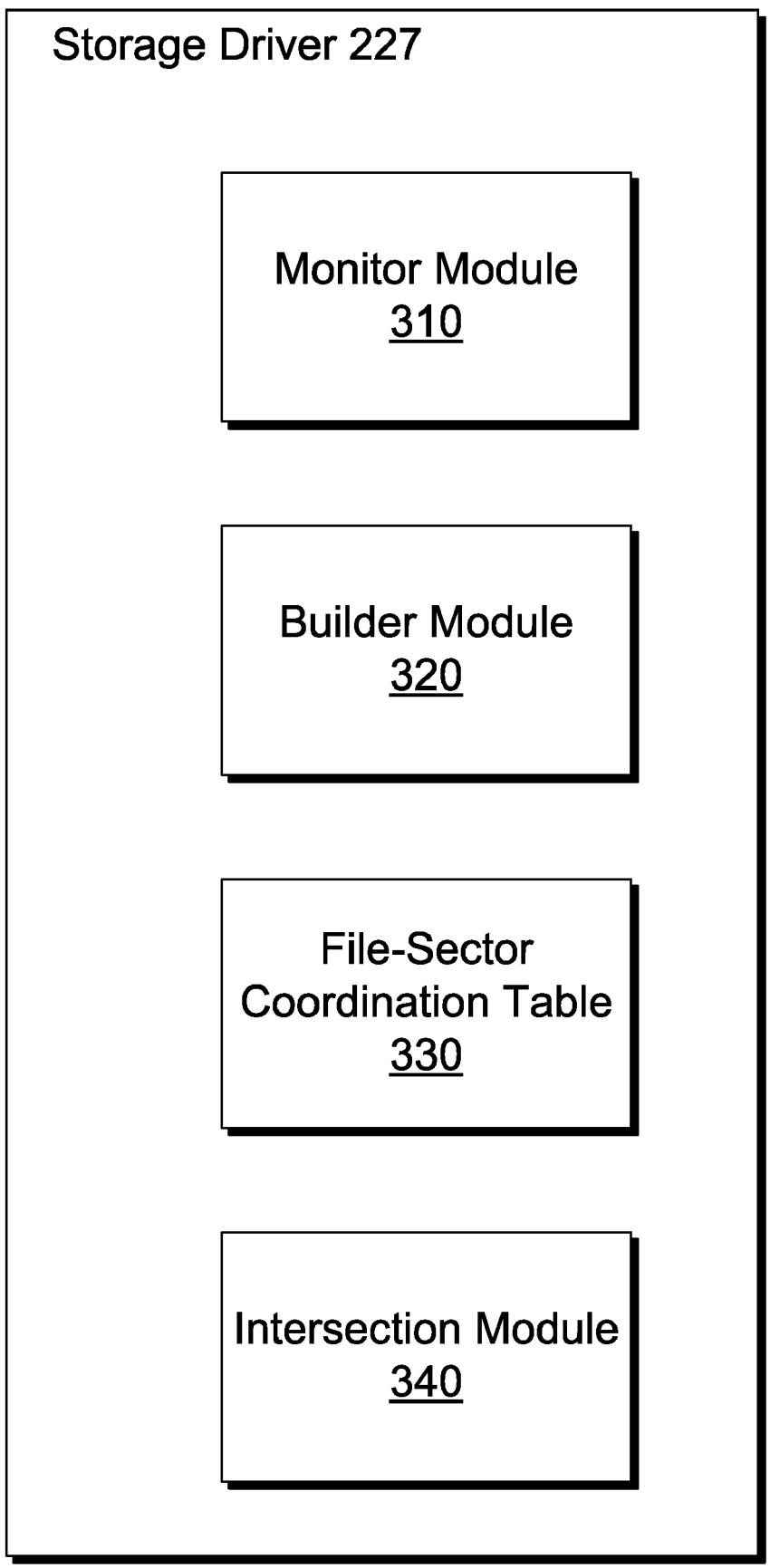
FIG. 3 illustrates one embodiment of a storage driver in the mobile computing device shown in FIG. 2.

FIG. 3 is a block diagram illustrating one embodiment of the storage driver 227. As illustrated, the storage driver 227 includes a monitor module 310, a builder module 320, a file-sector coordination table 330, and an intersection module 340.

The monitor module 310 comprises a software or firmware instructions for monitoring write transactions in local storage of the mobile computing device 110 (e.g., the flash memory 214). The write transactions may be high level operations (e.g., deleting a file, creating a directory) or low level operations (e.g., write data in a sector). The monitor module 310 maintains a list of sectors modified by the low level write transactions.

In order to modify a file (or a directory), an application must necessarily modify contents in one or more sectors associated with the file or directory via one or more write transactions. For example, a computer (the host computer) mounted with the mobile computing device 110 may take over high level access control of local storage in the mobile computing device 110. An application (the remote application) running in the host computer may directly access data on the local storage using low level controls provided by the storage driver 227. The remote application may overwrite data stored in sectors in the local storage with new data, and thereby modify files and/or directories in the storage. The monitor module 310 is configured to monitor all these write transactions occurred in the local storage and identify sectors affected by the write transactions (the modified sectors). In one example, the monitor module 310 compiles a sector list or a sector bitmap to store the modified sectors.

The builder module 320 comprises a software or firmware instructions for building the file-sector coordination table (hereinafter called the "coordination table") 330 that represents a mapping of files (and directories) and their associated (or occupied) FAT sectors in the local storage. In a FAT storage device, storage spaces are organized using FAT sectors (hereinafter called sectors). With few exceptions (e.g., the boot sector), most sectors may be associated with any file or directory. Therefore, one cannot identify associated file or directory (or whether it is used at all) by looking at a sector alone.

The builder module 320 traverses (or enumerates) the FAT structure of the local storage to determine the association between sectors and files (and directories), and stores the association in the coordination table 330. The coordination table 330 can be used to identify files (and directories) associated with modified sectors.

In one example, the coordination table 330 lists all (or a subset of) files and directories in the local storage and their corresponding sectors. The storage driver 227 can identify the associate file (or directory) of a sector by searching for the sector (e.g., by its storage address) in the coordination table. The table below illustrates an example of a coordination table 330 for files and directories of a memory card in a digital camera.

| File or Directory Identification | Sector Address |
| --- | --- |
| /Canon/ | 0x0100 |
| IMG_0463.JPG | 0x0101 |
| IMG_0463.JPG | 0x0105 |
| IMG_0463.JPG | 0x0107 |
| IMG_0463.JPG | 0x0110 |

As illustrated in the above table, the directory "/Canon/" is associated with one sector at address 0x0100. The file "IMG_0463.JPG" is associated with four sectors with addresses of 0x0101, 0x0105, 0x0107, and 0x0110. Therefore, if a write transaction of sector 0x0105 is monitored, the storage driver 227 can determine that the file "IMG_0463.JPG" is modified.

The intersection module 340 comprises a software or firmware instructions for detecting modified files and/or directories. In one embodiment, the intersection module 340 intersects the coordination table 330 and the sector list (or bitmap) to obtain files and directories associated with the modified sectors. Contents of the associated files and directories are modified by the write transactions. By detecting the changes made to the parent directory, the intersection module 340 also detects the newly created (or moved or deleted) subdirectory and newly added (or moved or deleted) files. For example, a subdirectory may be created in a parent directory and files may be added to the subdirectory. As another example, the host computer may delete a collection of files and subdirectories by deleting their hosting directory. Therefore, the intersection module 340 detects modified files and directories in the local storage without traversing the entire FAT structure.

Overview of Methodology

Figure 4:
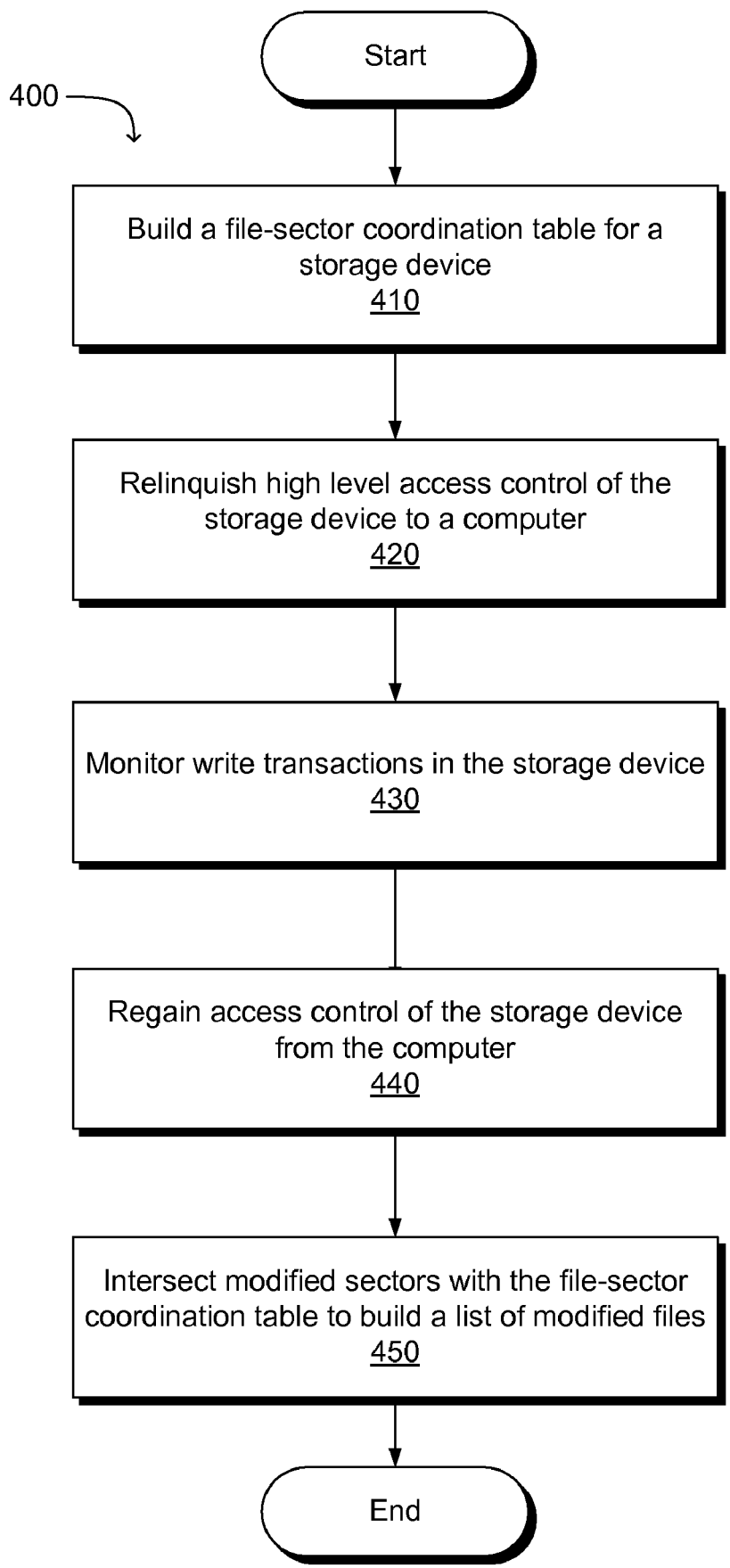
FIG. 4 is a flowchart illustrating an example method for detecting modified files and directories in a storage device.

FIG. 4 is a flowchart illustrating an example method (or process) 400 for detecting modified files and directories in a storage device. In one embodiment, the method 400 is implemented in a mobile device such as the mobile computing device 110, and the storage device is the flash memory 214, the RAM 216, or other storage devices in (or connected with) the mobile computing device 110. One or more portions of the method 400 may be implemented in embodiments of hardware and/or software or combinations thereof.

By way of example, the method 400 may be embodied through instructions for performing the actions described herein and such instrumentations can be stored within a tangible computer readable medium, e.g., the flash memory 214 or the RAM 216, and are executable by a processor, e.g., the central processor 220. Alternatively (or additionally), the method 400 may be implemented in modules like the storage driver 227. Furthermore, those of skill in the art will recognize that other embodiments can perform the steps of the method 400 in different order. Moreover, other embodiments can include different and/or additional steps than the ones described here.

Initially, the storage driver 227 builds 410 a file-sector coordination table (hereinafter called the coordination table) for all (or a subset of) files and directories in the storage device. The storage driver 227 may traverse the FAT structure of the storage device to collect information about files and directories stored in the storage device and their associated sectors. The storage driver 227 may build 410 the coordination table using the collected information.

In one embodiment, the coordination table is built 410 after the mobile computing device 110 receives a signal requesting it to relinquish high level access control of the storage device. For example, the storage driver 227 may build the coordination table after the mobile computing device 110 is communicatively connected (e.g., mounted) with a desktop computer.

The storage driver 227 relinquishes 420 high level access control of the storage device to a computer (the host computer). After obtaining the high level access control, the host computer can access (e.g., read, write) data stored in the storage device directly. The storage driver 227 passively monitors the host computer's operations in the storage device.

The storage driver 227 monitors 430 write transactions in the storage device. The write transactions may be from remote applications running in the host computer. As described above, in order to modify a file (or a directory), an application must necessarily modify contents in one or more sectors associated with the file or directory via one or more write transactions. Therefore, the storage driver 227 can safely ignore other types of transactions (e.g., read transactions).

The storage driver 227 identifies sectors in the storage device affected (or modified) by the monitored write transactions (hereinafter called the "modified sectors"). A write transaction may impact more than one sector. A sector may be modified by multiple write transactions. The storage driver 227 compiles a sector list or a sector bitmap to store the modified sectors.

The storage driver 227 (or the mobile computing device 110) regains 440 high level access control of the storage device from the host computer. For example, the storage driver 227 regains 440 the control when the computing device 110 is disconnected from the host computer. Alternatively, the host computer may release the control without disconnecting from the mobile computing device 110.

The storage driver 227 intersects 450 the sector list (or bitmap) with the coordination table to build a list of modified files and directories. As described above, the coordination table maps sectors to their associated files and directories and the sector list contains modified sectors. Therefore, by intersecting 450 the sector list with the coordination table, the storage driver 227 may detect files and directories associated with the modified sectors as modified files and directories. As described above, the detected modified directories may also lead to newly created (or moved) files and directories that do not exist in the coordination table. In one embodiment, the list of modified files and directories is a tree structure, reflecting the hierarchy of the files and directories in the file system.

In one embodiment, instead of building the list of modified files and directories after regaining access control from the host computer, the storage driver 227 builds and maintains the list while passively monitoring local write transactions by consulting the coordination table.

The storage driver 227 may transmit (or share) the list of modified files and directories (or a portion of the list) to relevant applications for them to update their index or database. For example, the storage driver 227 may signal (or notify) a media player application of modified, newly created (or moved), and deleted media files, such that the media player application may update its media library accordingly.

Alternative Embodiments

One of ordinary skill in the art will readily recognize that the described system and method are not limited to mobile computing devices and can be implemented in a broad range of computing devices. It is noted that the system and method can be used to detect and index modified files and/or directories in multiple storage devices located together or apart from each other. The storage devices may use file systems other than FAT, and their storages may be organized in units other than sectors.

Advantages of the disclosed embodiments include efficient detection of modified files in a storage device. Devices containing storage medium frequently relinquish control of the file system on the storage medium to an external computer (the host computer), so that the host computer can access the storage medium directly. By using the disclosed embodiments, the devices can detect files and directories modified by the host computer without enumerating the entire FAT structure of the storage medium. As a result, systems and/or applications may index (or backup) the modified files quickly and provide prompt user access to up-to-date contents.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for detecting modified files and directories in a FAT file system. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for detecting modified files from a plurality of files stored in a plurality of sectors of a storage device, the method comprising:

building a file-sector coordination table for the plurality of files, the file-sector coordination table comprising information about sectors used by each of the plurality of files;

relinquishing a high-level access control of the storage device to a computer;

monitoring write transactions in the storage device while the high-level access control of the storage device is relinquished to the computer;

identifying sectors affected by the monitored write transactions;

regaining the high-level access control of the storage device from the computer; and intersecting, after regaining the high-level access control of the storage device from the computer, a collection of sector identifiers of the identified sectors with the file-sector coordination table to build a list of modified files.

2. The method of claim 1, wherein the list of modified files includes data files and directories.

3. The method of claim 1, wherein a modified file comprises at least one of a new file, a deleted file, a moved file, and a changed file.

4. The method of claim 1, wherein the storage device uses one of the variants of the File Allocation Table (FAT) file system.

5. The method of claim 1, wherein building the file-sector coordination table comprises:

building the file-sector coordination table for the plurality of files by traversing the storage device.

6. The method of claim 1, wherein identifying the sectors affected by the monitored write transactions further comprises:

compiling a sector list or a sector bitmap to store the identified sectors.

7. The method of claim 1, wherein intersecting the collection of sector identifiers of the identified sectors with the file-sector coordination table to build the list of modified files comprises:
for each identified sector, identifying an associated file in the file-sector coordination table and adding the associated file to the list of modified files.

8. The method of claim 1, wherein building the file-sector coordination table for the plurality of files comprises:
building the file-sector coordination table responsive to receiving a signal requesting for relinquishment of the high-level access control of the storage device to the computer.

9. The method of claim 1, wherein intersecting the collection of sector identifiers of the identified sectors with the file-sector coordination table to build the list of modified files comprises:
identifying newly created or moved files based on the collection of sector identifiers of the identified sectors and the file-sector coordination table.

10. The method of claim 1, further comprising:
notifying an associated application of the list of modified files.

11. A non-transitory computer readable medium with stored instructions, the instructions when executed by a processor cause the processor to perform a method comprising:
building a file-sector coordination table for a plurality of files stored in a plurality of sectors of a storage device, the file-sector coordination table comprising information about sectors used by each of the plurality of files;
relinquishing a high-level access control of the storage device to a computer;
monitoring write transactions in the storage device while the high-level access control of the storage device is relinquished to the computer;
identifying sectors affected by the monitored write transactions;
regaining the high-level access control of the storage device from the computer; and
intersecting, after regaining the high-level access control of the storage device from the computer, a collection of sector identifiers of the identified sectors with the file-sector coordination table to build a list of modified files.

12. The non-transitory computer readable medium of claim 11, wherein a modified file comprises at least one of a new file, a deleted file, a moved file, and a changed file.

13. The non-transitory computer readable medium of claim 11, wherein the storage device uses one of the variants of the File Allocation Table (FAT) file system.

14. The non-transitory computer readable medium of claim 11, wherein intersecting the collection of sector identifiers of the identified sectors with the file-sector coordination table to build the list of modified files comprises:
for each identified sector, identifying an associated file in the file-sector coordination table and adding the associated file to the list of modified files.

15. The non-transitory computer readable medium of claim 11, wherein intersecting the collection of sector identifiers of the identified sectors with the file-sector coordination table to build the list of modified files comprises:
identifying newly created or moved files based on the collection of sector identifiers of the identified sectors and the file-sector coordination table.

16. A mobile computing device, comprising:
a storage device using a File Allocation Table (FAT) file system, the storage device containing a plurality of files in a plurality of sectors;
a storage driver configured for building a file-sector coordination table for the plurality of files, the file-sector coordination table comprising information about sectors used by each of the plurality of files, the storage driver further configured for relinquishing a high-level access control of the storage device to a computer, monitoring write transactions in the storage device while the high-level access control of the storage device is relinquished to the computer, identifying sectors affected by the monitored write transactions in the storage device, regaining the high-level access control of the storage device from the computer, and intersecting, after regaining the high-level access control of the storage device from the computer, a collection of sector identifiers of the identified sectors with the file-sector coordination table to build a list of modified files.

17. The mobile computing device of claim 16, wherein a modified file comprises at least one of a new file, a deleted file, a moved file, and a changed file.

18. The mobile computing device of claim 16, wherein the list of modified files includes data files and directories.

19. The mobile computing device of claim 18, wherein the storage driver is further configured for identifying an associated file in the file-sector coordination table for each identified sector and adding the associated file to the list of modified files.

20. The mobile computing device of claim 18, wherein the storage driver is further configured for identifying newly created or moved files based on the collection of sector identifiers of the identified sectors and the file-sector coordination table.

* * * * *